June 5, 1956 D. W. MORRIS 2,748,757
INTERNAL COMBUSTION ENGINE COMBUSTION CHAMBER
Filed June 23, 1952 3 Sheets-Sheet 1

DONALD W. MORRIS
INVENTOR.

BY

ATTORNEYS

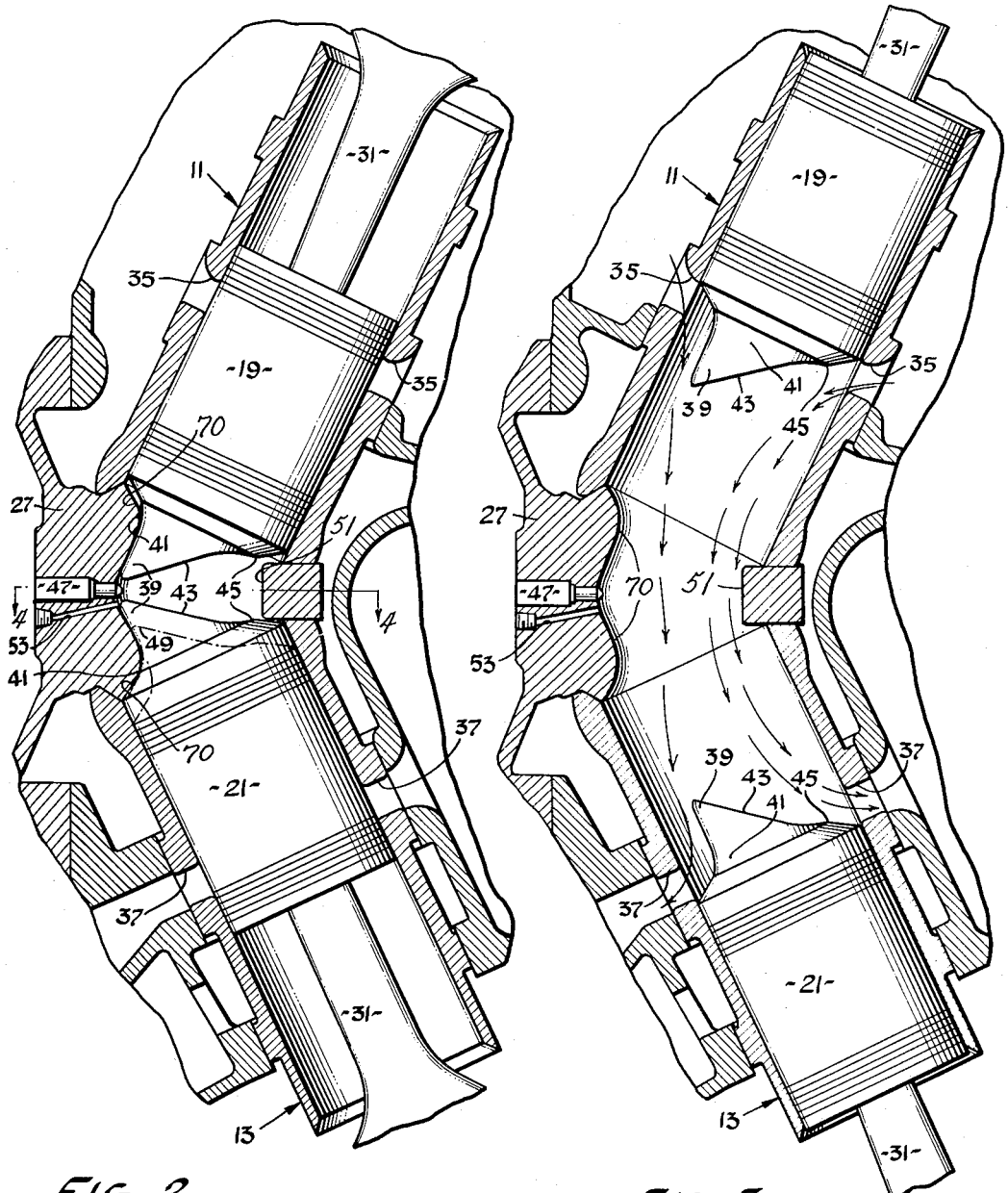

June 5, 1956　　　　　D. W. MORRIS　　　　　2,748,757
INTERNAL COMBUSTION ENGINE COMBUSTION CHAMBER
Filed June 23, 1952　　　　　　　　　　　　　3 Sheets-Sheet 3

DONALD W. MORRIS
INVENTOR.

BY
Mellin and Hanscom
ATTORNEYS

United States Patent Office 2,748,757
Patented June 5, 1956

2,748,757

INTERNAL COMBUSTION ENGINE COMBUSTION CHAMBER

Donald W. Morris, Berkeley, Calif., assignor to Morris Development Company, Los Angeles, Calif., a copartnership Application June 23, 1952, Serial No. 295,018

4 Claims. (Cl. 123—53)

This invention relates to internal-combustion engines, particularly diesel engines of the type having angularly arranged opposed cylinders.

My prior patent entitled "Internal-Combustion Engine," No. 2,507,923, discloses a diamond arrangement of two pairs of angularly arranged opposed cylinders, and it is a main object of the present invention to provide improvements in such an engine. Although my invention is ideally embodied in an engine of the particular type above described, certain of its concepts have application to other types of diesel engines as well as to internal-combustion engines in general.

It is well known that increased power and superior operating conditions are obtained by producing a better mixture of fuel and air. A primary object of the present invention is to provide design features centralized around a combustion chamber effective to produce a better mixture of fuel and air in the combustion chamber than heretofore attained.

A more particular object of the present invention is to provide an engine of the above general type wherein the cylinder head, which is disposed between the cylinders in which the pistons operate, and the crown or working ends of a pair of opposed pistons, are specially generally complementally formed to create a highly beneficial turbulent condition of the air in the cylinders to effect a superior fuel-air mixture not heretofore attained, to thereby allow, among other advantages to be set out hereinafter, the injection of fuel into the combustion chamber through a lesser number, and therefore larger, fuel injection orifices.

Another object of the present invention is to provide such designed features as above set out without materially impairing the flow of air from the intake cylinder through the cylinder head to the exhaust cylinder, and without materially decreasing the length of travel of the fuel sprayed into the combustion chamber.

A further object of the present invention is to provide specially designed crowns on the working ends of the pistons, which are beneficial to the ingress of air into the intake cylinder and the egress of exhaust gas and scavenge air out of the exhaust cylinder.

A still further object of the present invention is to provide an engine wherein the cylinder head and the working ends of the pistons are specially formed to decrease the likelihood of fuel impinging against the cylinder walls, and further, in which the pistons cooperate with the cylinder head to positively throw whatever fuel that is deposited or trickles onto the cylinder walls back into the combustion chamber, to thereby make for easier lubrication of the pistons and cylinders by reducing the amount of raw fuel on the cylinder walls.

Various other objects of the present invention will be apparent from the following description taken in connection with the accompanying drawings, wherein:

Fig. 2 is an enlarged fragmentary view in section showing two angularly arranged opposed cylinders in which the pistons are disposed at combustion positions.

Fig. 3 is a view similar to Fig. 2 but showing the pistons as having been moved to intake and exhaust positions, the arrows showing the inflow of air into and the outflow of exhaust gas out of the cylinders.

Figure 1:
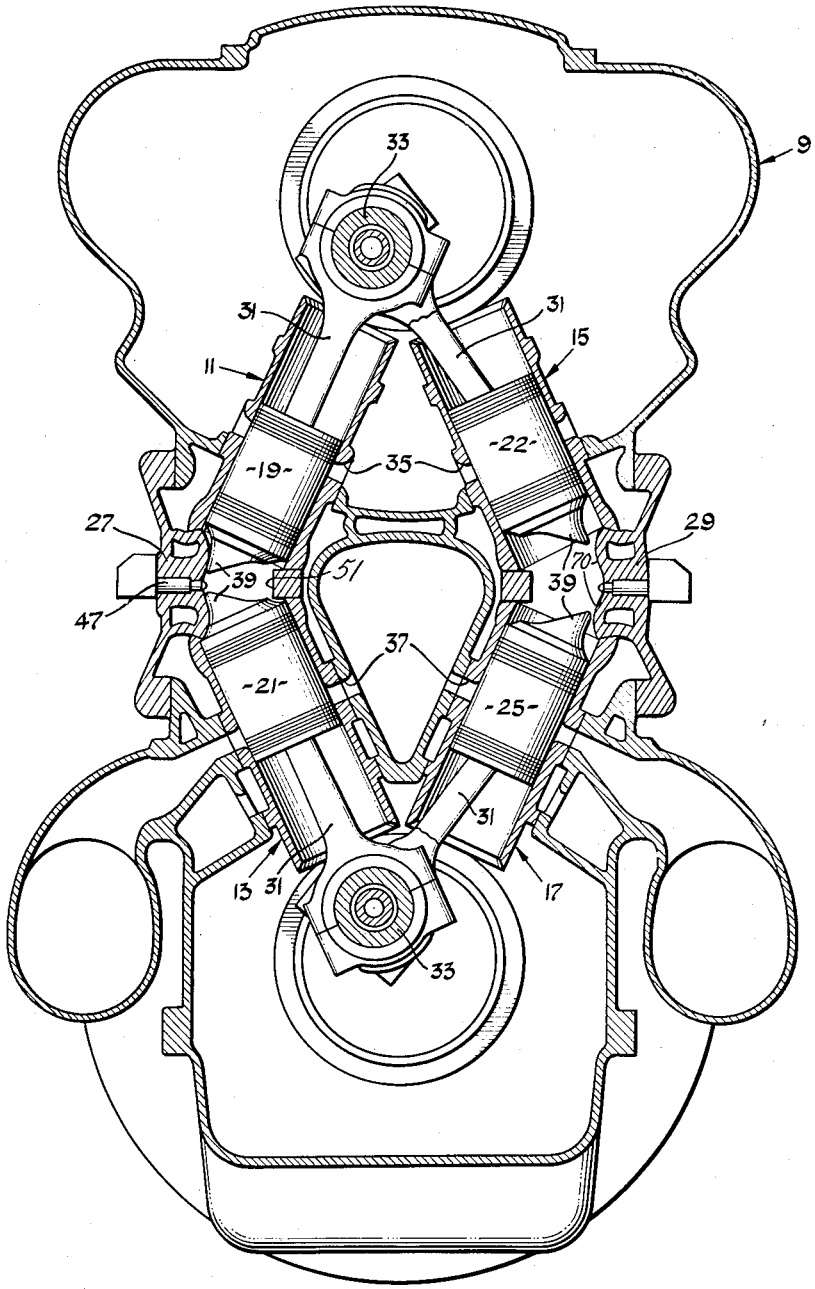
Fig. 1 is a somewhat schematic vertical cross-sectional view through a diesel engine of the diamond cylinder arrangement, which engine embodies the concepts of the present invention.

Referring to the accompanying drawings wherein similar reference characters designate similar parts throughout, the diesel engine disclosed in Fig. 1 comprises generally a hollow framework 9, having mounted therein by supporting webs four cylinders 11, 13, 15 and 17 (in the bank of cylinders shown) arranged in a diamond formation and having pistons 19, 21, 22 and 25 riding therewithin. Cylinders 11 and 15 are intake cylinders, whereas cylinders 13 and 17 are exhaust cylinders. Cylinders 11 and 13 at their adjacent ends bear against a cylinder head 27, whereas cylinders 15 and 17 at their adjacent ends bear against a cylinder head 29. The pistons in the cylinders are connected by connecting rods 31 to crankshafts 33, which are rotatably supported by framework 9. Since the pairs of angularly disposed cylinders and their associated parts are identical in construction, only cylinders 11 and 13 and their associated parts will be described in detail.

Intake air is adapted to enter intake cylinder 11 through radial intake ports 35, and scavenge air and exhaust gas is adapted to pass out of the exhaust cylinder 13 through exhaust ports 37. The particular arrangement of compartmenting the framework 9 in order to provide for an intake air compartment and an exhaust gas compartment is not of particular importance with regard to the present invention, and therefore the particular schematic showing in Fig. 1, or the reference to my prior patent is not intended to be a limiting factor on the disclosure of the present invention. Nor is the particular manner of cooling the cylinders shown intended to be a limitation, since the manner of cooling thereof may be similar to that disclosed in my copending application entitled "Internal-Combustion Engine" filed February 23, 1952, bearing Serial No. 273,049.

Now, referring particularly to Figs. 2 through 5, it is apparent that each piston has a reduced upper end 39 joined to its body by a generous fillet 41, said reduced end being angularly truncated to provide a flat top face 43 generally merging at its lowest side 45 with fillet 41. The peaked crown thus formed can be generally described as the bottom inclined frustrum of a cylinder of smaller diameter than the diameter of the piston generally coaxially arranged with the piston and integrally joined to the piston by a generous fillet.

Cylinder head 27 has a fuel injector 47 therein and, as is apparent from Fig. 2, fuel is sprayed into the combustion chamber in a direction generally parallel to the top flat faces 43 of the pistons 19 and 21. The advantages of this construction will be explained hereinafter.

Cylinder head 27 has on its opposite faces annular shoulders complementally formed to the configuration of the sides of the peaked crowns of the opposed pistons 19 and 21 so that, as shown by the broken lines 49 in Fig. 2, the peaked crowns of the opposed pistons are substantially in sliding engagement therewith and a quantity of air is somewhat trapped by each piston just before the piston reaches the top end of its stroke. This trapped air upon further movement of the pistons is compressed and forced to travel circumferentially around the peaked crowns in both directions with respect to the fuel injector toward the opposite sides of the cylinder head and pistons, as most clearly shown by the arrows in Fig. 4. As is apparent from Fig. 4 the two streams of air created by each piston come together at a place approximately diametrically opposite from the fuel injector 47 and are inturned upon one another by such contact to create twin vortexes within the combustion chamber so that turbulent conditions are created. The side of the cylinder head diametrically opposite from the fuel injector 47 has a rise 51 formed therein which assists in forming these vortexes. The fuel issuing from the fuel injector is thoroughly mixed by the twin vortexes thus formed so that effective and efficient combustion of the mixture of fuel and air is attained.

Figure 4:
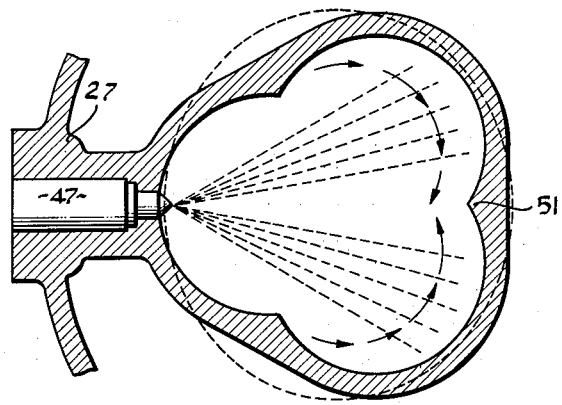
Fig. 4 is a cross-sectional view taken along line 4—4 of Fig. 2, showing by way of arrows the turbulent flow of air created by co-action of the pistons and cylinder head.
Figure 5:
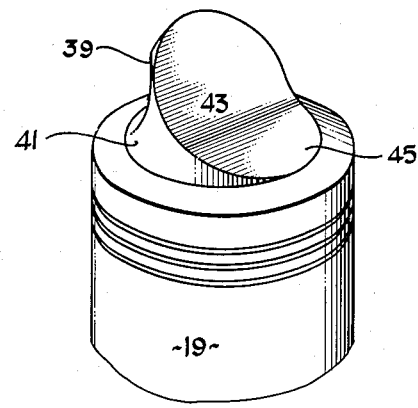
Fig. 5 is a perspective view showing the shape of the crown of a piston.

Fig. 4 shows the cross-sectional opening through the cylinder head and it is apparent that a three-lobe opening has been provided of such a size as not to materially restrict the passage of air from the intake cylinder to the exhaust cylinder which, of course, occurs under exhaust and intake conditions. (The scavenge air enters the ports in the intake cylinder, passes through both cylinders, and out through the ports in the exhaust cylinder.)

By such an excellent turbulence of the air, it is possible to provide an injection nozzle with fewer injection orifices. The fewer injection orifices, the larger the size of such orifices, and therefore the likelihood of plugging of such orifices is materially reduced. As indicated in Fig. 4, fuel injector 47 has two injection orifices to create twin jets of fuel sprayed into the combustion chamber. With the extremely beneficial turbulent conditions created, it may be even possible to provide a single orifice fuel injector. Obviously, however, a three-orifice or four-orifice fuel injector can be utilized.

A test-duct 53, normally closed at its outer end by a suitable plug, is conventionally provided in the cylinder head for taking tests of combustion pressures.

Figure 6A:
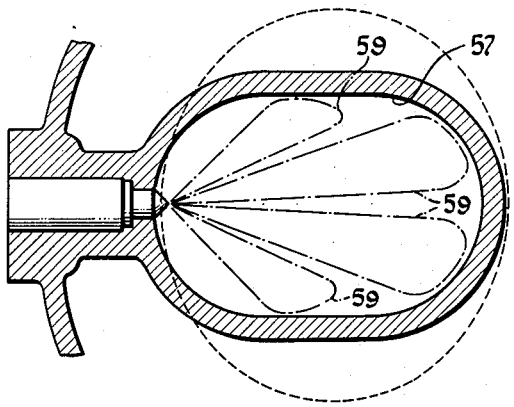
Figs. 6a, 6b and 6c show other possible modified designs of the opening through the cylinder head, and showing by way of example a possible fuel spray pattern to be provided in these different combustion chambers.
Figure 6B:
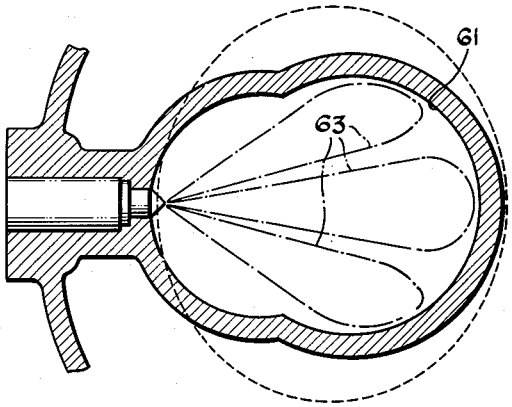
Figure 6C:
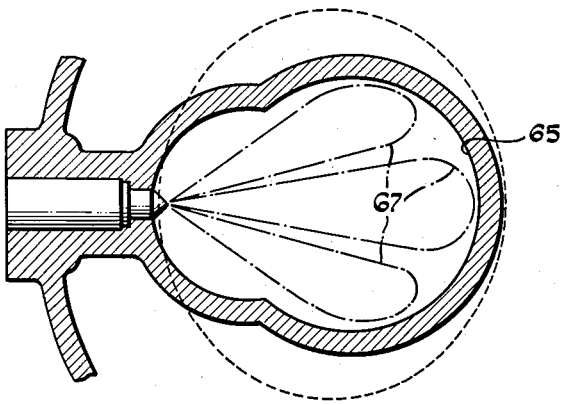

Figs. 6a, 6b and 6c indicate possible variations in the configuration of the cross-sectional opening through the cylinder head. In 6a it is apparent that a generally oval opening 57 has been provided, and shown jetting into the combustion chamber is a spray comprising four separate jets 59. The showing of the four jets issuing into the combustion chamber so formed is not intended to be limiting, but merely suggestive. Fig. 6b shows a double lobed opening 61 through the cylinder head comprising a small lobe in the region of the fuel injector and a larger lobe extending outwardly therefrom. A spray of fuel into the so-formed combustion chamber is depicted in the form of three jets 63, and this again is not intended to be limiting on the invention but merely suggestive. Two jets of fuel could be as well injected into this chamber. Fig. 6c shows a modified form of opening 65 through the cylinder head, and there the left-hand lobe of the opening is substantially smaller than the right-hand larger lobe as compared to the showing of Fig. 6b. Three jets 67 are shown issuing into the combustion chamber.

By the novel features above described, many advantages are obtained. In many conventional diesel engines, of the two-stroke cycle type, in order to obtain sufficient turbulence of the intake air, the air inlet ports or passages are arranged tangentially to the interior of the intake cylinder. This disposition of the intake passages inherently lessens the possible air inlet area as compared to a radial disposition of the inlet passages or ports. In the present design, where a turbulent condition is created by the coaction of the pistons and the cylinder head, a radial location of the intake ports is made practicable.

It is evident that the turbulent condition of the air in the combustion chamber will increase with an increased speed of the diesel engine, and therefor ideal conditions for a higher speed diesel engine are provided, since with a higher speed, the time for mixture is less and therefore the condition of turbulence should be greater than when the pistons are operating at a lower speed.

By the special complemental formation of the pistons and cylinder head, the fuel from the fuel injector is directed generally parallel to the top piston faces 43 (so as not to directly impinge thereon) toward the wall of the cylinder head opposite the fuel injector, which wall being relatively hot will prevent the collection of fuel thereon. Further, since there are substantially no exposed areas of the cylinder walls opposite the fuel injector, the direct impingement of the sprayed fuel on the cylinder walls is not possible. Even if raw fuel does dribble down the cylinder walls upon the retreating strokes of the pistons, the angular fillet portions of the pistons and the complemental portions of the cylinder head serve to somewhat trap air therebetween to blow this raw fuel back into the combustion chamber. This naturally results in a decrease in the amount of raw fuel on the cylinder walls and therefore makes for easier proper lubrication of the pistons within the cylinders.

Also, as is apparent from Fig. 3, the peaked crown on the intake piston tends to properly divide and direct intake air into the intake cylinder, and the peaked crown on the exhaust piston likewise readily and properly divides the scavenge air and exhaust gas for easy egress through the exhaust ports. It is further pointed out that all the exhaust ports are uncovered at one time, making for efficient scavenging and egress of scavenge air and exhaust gas through the exhaust ports.

By providing peaked crowns on the pistons, the terminals of such peaked crown will attain a temperature hotter than the remainder of the pistons, and therefore will reduce the ignition delay period, will aid in the smooth running of the engine and will make for early combustion.

Some authorities assert that a cross-flow of air across the fuel injector tip is objectionable as tending to form carbon on the tip. It is pointed out in the present invention that the peaked ends of the pistons serve to effectively seal against the cylinder head at places adjacent the fuel injector so that the trapped air is forced circumferentially around toward the opposite wall of the cylinder head, and therefore cross-flow across the injection tip is substantially avoided.

It is further pointed out that by providing annular fillet or shelf areas on the pistons, which areas almost contact the cylinder head around the entire circumference of the pistons, a quench or cooling area on each piston is provided, because of the proximity of the named surfaces to the cylinder head at combustion, which will tend to prevent the heat of combustion, or conduction through the metal, or hot gases from passing downwardly along the pistons to the first piston ring, and this serves to lengthen ring life Further, by providing peaked crowns on the pistons, the trapping of a column of exhaust air near the axis of the exhaust cylinder just after scavenging is lessened.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In an internal combustion engine, a cylinder head, and a pair of opposed pistons adapted to move in unison toward and away from the cylinder head on opposite sides thereof, said cylinder head having an inwardly extending annular shoulder facing each piston, each piston having a reduced upper end to pass into the opening defined by the associated annular shoulder on the cylinder head of a size to be substantially in sliding engagement wtih said shoulders, the reduced upper end of each piston being surrounded by an annular shelf complemental in formation to the opposed annular shoulder on the cylinder head, said reduced upper ends of said pistons being angularly truncated whereby air trapped between said annular shoulders and said annular shelves when the high side of said reduced upper ends of the pistons enter the openings defined by said annular shelves is forced out tangentially around said reduced upper ends of the pistons and creates a double vortex within the combustion chamber adjacent the low side of the reduced upper end of each of said pistons, the high side of each of said opposed pistons being disposed toward the same side of the engine and a fuel injector in said cylinder head adjacent the high sides of said pistons adapted to inject a fuel spray substantially diametrically across the tops of said piston heads at right angles to the axes of said vortices.

2. In an internal combustion engine, a cylinder head, and a pair of opposed pistons adapted to move in unison toward and away from the cylinder head on opposite sides thereof, said cylinder head having an inwardly extending annular shoulder facing each piston, each piston having a reduced upper end to pass into the opening defined by the associated annular shoulder on the cylinder head of a size to be substantially in sliding engagement with said shoulders, the reduced upper end of each piston being surrounded by an annular shelf complemental in formation to the opposed annular shoulder on the cylinder head, the reduced upper end of each piston being angularly truncated, whereby air trapped between said annular shoulders and said annular shelves when the high side of said reduced upper ends of the pistons enter the openings defined by said annular shoulders is forced out tangentially around said reduced upper ends of the pistons and creates a double vortex within the combustion chamber adjacent the low side of the reduced upper end of each of said pistons, and a fuel injector in said cylinder head adjacent the high sides of said pistons adapted to inject a fuel spray substantially diametrically across the tops of said piston heads at right angles to the axes of said vortices.

3. In an internal combustion engine, a cylinder head, and a pair of opposed pistons adapted to move in unison toward and away from the cylinder head on opposite sides thereof, said cylinder head having an inwardly extending annular shoulder facing each piston, each piston having a reduced upper end to pass into the opening defined by the associated annular shoulder on the cylinder head of a size to be substantially in sliding engagement with said shoulders, the reduced upper end of each piston being surrounded by an annular shelf complemental in formation to the opposed annular shoulder on the cylinder head, the reduced upper end of each piston being angularly truncated, whereby air trapped between said annular shoulders and said annular shelves when the high sides of said reduced upper ends of the pistons enter the openings defined by said annular shoulders is forced out tangentially around said reduced upper ends of the pistons and create a double vortex within the combustion chamber adjacent the low side of the reduced upper end of each of said pistons, the peaks of the upper ends being disposed on the same sides of their respective pistons, and a fuel injector in said cylinder head adjacent the high sides of said pistons adapted to inject a fuel spray substantially diametrically across the tops of said piston heads at right angles to the axes of said vortices.

4. In an internal combustion engine, a cylinder head, a pair of opposed pistons adapted to move in unison toward and away from the cylinder head on opposite sides thereof, said cylinder head having an inwardly extending annular shoulder facing each piston, each piston having a reduced upper end to pass into the opening defined by the associated annular shoulder on the cylinder head, the reduced upper end of each piston being surrounded by an annular shelf complemental in formation to the opposed annular shoulder on the cylinder head, the reduced upper end of each piston being angularly truncated and said head being formed complementally to the upper ends of the pistons, the peaks of the upper ends being disposed on the same sides of their respective pistons, and means for jetting fuel into the combustion chamber from the side of the cylinder head adjacent the high sides of the upper ends of the piston crowns.

References Cited in the file of this patent

UNITED STATES PATENTS

| | | |
|---|---|---|
| 1,124,840 | Blanchard | Jan. 12, 1915 |
| 1,208,998 | Mackay | Dec. 19, 1916 |
| 1,258,155 | Shepherd | Mar. 5, 1918 |
| 1,406,319 | Wygodsky | Feb. 14, 1922 |
| 1,798,967 | Chedru | Mar. 31, 1931 |
| 1,923,666 | French | Aug. 22, 1933 |
| 1,976,630 | Pescara | Oct. 9, 1934 |
| 1,983,198 | Steiger | Dec. 4, 1934 |
| 2,016,734 | Wittenberg et al. | Oct. 8, 1935 |
| 2,507,923 | Morris | May 16, 1950 |

FOREIGN PATENTS

| | | |
|---|---|---|
| 298,225 | Germany | June 11, 1917 |
| 377,470 | Italy | Dec. 18, 1939 |
| 857,909 | France | Apr. 29, 1940 |